(12) United States Patent
Udd

(10) Patent No.: US 9,417,127 B2
(45) Date of Patent: Aug. 16, 2016

(54) FIBER GRATING SENSOR SYSTEM FOR MEASURING KEY PARAMETERS DURING HIGH SPEED

(71) Applicant: Eric Udd, Fairview, OR (US)

(72) Inventor: Eric Udd, Fairview, OR (US)

(73) Assignee: Eric Udd, Fairview, OR (US)

( * ) Notice: Subject to any disclaimer, the term of this patent is extended or adjusted under 35 U.S.C. 154(b) by 881 days.

(21) Appl. No.: 13/658,535

(22) Filed: Oct. 23, 2012

(65) Prior Publication Data

US 2015/0268096 A1    Sep. 24, 2015

(51) Int. Cl.

| G01B 11/16 | (2006.01) |
|---|---|
| G01J 3/18 | (2006.01) |
| G01J 3/10 | (2006.01) |
| G01K 11/32 | (2006.01) |
| G01L 1/24 | (2006.01) |
| G01L 11/02 | (2006.01) |

(52) U.S. Cl.
CPC ................. *G01J 3/1895* (2013.01); *G01J 3/10* (2013.01); *G01K 11/3206* (2013.01); *G01L 1/246* (2013.01); *G01L 11/025* (2013.01); *G01J 2003/102* (2013.01)

(58) Field of Classification Search
CPC ....................................................... G01B 11/16
USPC ............................................................ 356/32
See application file for complete search history.

(56) References Cited

U.S. PATENT DOCUMENTS

| 5,380,995 A | * | 1/1995 | Udd | ................... | G01D 5/35303 |
|---|---|---|---|---|---|
| | | | | | 250/227.18 |
| 5,627,927 A | * | 5/1997 | Udd | ................... | G01D 5/35312 |
| | | | | | 385/24 |
| 5,646,401 A | * | 7/1997 | Udd | ................... | G01D 5/35383 |
| | | | | | 250/227.18 |

(Continued)

OTHER PUBLICATIONS

Eric Udd, "Sensing high speed phenomena using fiber gratings and the Sagnac interferometer", Proceedings of SPIE, vol. 7753, 2011.

(Continued)

*Primary Examiner* — Roy M Punnoose

(57) ABSTRACT

A fiber grating sensor system is used to measure key parameters that include pressure, strain and temperature at specific locations and at high speed. The system relies on spectral properties associated with the fiber grating sensors, the light source and the optical detection system to provide these capabilities. The system has been successfully applied to measurement of pressures up to 1,200,000 psi and by increasing the spectral width of the light source extensions of pressure measurements to 4,000,000 psi and higher are possible. Temperature change measurements have been made of 400 degrees C. over a period of 25 micro-seconds limited by the physical response of the fiber sensors and the output detector bandwidth both of which can be greatly improved by reducing fiber sizes and with improved detectors. Novel methods have been devised to lower cost and enable measurements with spatial location, speed and accuracy that have been very difficult or not yet achieved.

18 Claims, 20 Drawing Sheets

(56) References Cited

U.S. PATENT DOCUMENTS

| | | | | |
|---|---|---|---|---|
| 5,748,312 A * | 5/1998 | Kersey | .................... | G01L 1/246 250/227.23 |
| 5,828,059 A * | 10/1998 | Udd | ........................ | G01L 1/246 250/227.18 |
| 5,869,835 A * | 2/1999 | Udd | .................... | G01D 5/35383 250/227.14 |
| 6,204,920 B1 * | 3/2001 | Ellerbrock | ......... | G01D 5/35383 250/227.13 |
| 6,212,310 B1 * | 4/2001 | Waarts | ............... | G02B 6/29319 372/43.01 |
| 6,335,524 B1 * | 1/2002 | Udd | .................... | G01D 5/35383 250/227.14 |
| 6,795,599 B2 * | 9/2004 | Spirin | ............... | G01D 5/35303 385/12 |
| 6,876,786 B2 * | 4/2005 | Chliaguine | ......... | G01D 5/35303 250/227.11 |
| 6,903,820 B2 * | 6/2005 | Wang | .................... | A61B 5/0059 356/369 |
| 7,004,911 B1 * | 2/2006 | Tu | ........................ | A61B 5/015 600/549 |
| 7,038,190 B2 * | 5/2006 | Udd | ........................ | G01L 1/246 250/227.11 |
| 8,760,663 B2 * | 6/2014 | Tearney | ............... | A61B 5/0062 356/479 |
| 8,864,655 B2 * | 10/2014 | Ramamurthy | ........... | A61B 5/06 600/117 |
| 2003/0127587 A1 * | 7/2003 | Udd | ........................ | G01L 1/246 250/227.14 |
| 2005/0201664 A1 | 9/2005 | Udd | | |
| 2009/0028489 A1 | 1/2009 | Udd | | |

OTHER PUBLICATIONS

Benterou et al, "High speed measurements using fiber optic Bragg gratings", Proceedings of SPIE, vol. 8028, 2011.

Eric Udd et al, "Review of high-speed fiber optic grating sensor systems", Proceedings of SPIE, vol. 7677, 2010.

Benterou et al, "Embedded fiber-optic Bragg grating detonation velocity sensor", Proceedings of SPIE, vol. 7316, 2009.

Eric Udd et al, "Damage detection system with sub-microsecond resolution", Proceedings of SPIE, vol. 6933, 2008.

* cited by examiner

FIBER GRATING SENSOR SYSTEM FOR MEASURING KEY PARAMETERS DURING HIGH SPEED

The United States has rights in this invention pursuant to Contract Numbers W31P4Q-10-C-1087 and W31P4Q-11-C-0209 awarded by the US Army.

This application claims the benefit of U.S. Provisional Patent Application No. 61/628,106 by Eric Udd, entitled "Fiber grating sensor system for measuring key parameters during high speed events", which was filed on Oct. 24, 2011.

BACKGROUND OF THE INVENTION

This disclosure describes means to measure the location, velocity, pressure, strain and temperature associated with high speed events. It also describes embodiments that can be used to support these measurements by using optimized optical fiber grating sensors and employing appropriately configured read out techniques. Fiber grating sensor systems are described in detail in U.S. Pat. Nos. 5,380,995, 5,402,231, 5,828,059, 5,841,131, 6,144,026, and 6,335,524. Also U.S. patent application Ser. No. 11/071,278 by Eric Udd and Sean Calvert filed on Mar. 3, 2005 and U.S. patent application Ser. No. 12/217,666 which were abandoned teach a fiber grating sensor system for detection, localization and characterization of high speed pressure waves. The teachings associated in these prior art patents and patent applications are deemed to be fully incorporated into this disclosure. The present invention extends the capabilities of the high speed system with methods based on filtering techniques and improvements to sensor configurations that lowers the cost of sensors, improves the spatial resolution of the system with respect to pressure and temperature measurements and allows extensions of performance over wider ranges of pressure and temperature.

BRIEF DESCRIPTION OF THE PRESENT INVENTION

In the present invention a high speed fiber grating sensor system is described that is capable of measuring the position, velocity, pressure and temperate of a high speed event. The invention is particularly directed toward the measurement of localized pressure and temperature. This can include very high pressures of 1,000,000 to 4,000,000 psi and temperature ranges from absolute zero to the melting temperature of the material used to support the fiber grating. For quartz based systems this can be in excess of 1000 C and for sapphire in excess of 1600 C.

The invention consists of a light source that illuminates one or more specialized fiber gratings, in one or more fiber lines, that are placed and oriented along a path associated with the high speed event that is to be measured. The light source is designed with specific spectral profiles with edges and or peaks to provide wavelength measurement points. The reflected signals from the fiber grating sensors encountering the high speed event are then directed toward one of more optical detectors that may be wavelength dependent and are used to localize and characterize pressure, strain and temperature. For some embodiments additional filters with wavelength markers may be placed in front of the output optical detectors. The fiber grating sensors may be designed with specific wavelength markers. As an example these may be regions of low spectral reflectivity in chirped fiber gratings used to identify a specific spatial location. In order to separate pressure from temperature multiple fiber gratings or multi-parameter fiber grating sensors may be used. This can involve multiple read out detection lines that can as an example be used to separate out polarization states or it can involve separate fiber grating lines designed for different environmental responses.

Therefore it is an object of the invention to provide a very high speed system that is capable of measuring pressure at a specific spatial location.

Another objective of the invention is to measure strain at a specific spatial location.

Another objective of the invention is to measure temperature at a specific spatial location.

Another objective is to measure pressure at a specific time in a high speed event.

Another objective is to measure strain at a specific time in a high speed event.

Another objective is to measure temperature at a specific time in a high speed event.

Another objective is to measure the localized pressure and temperature simultaneously in a high speed event.

Another objective is to measure the localized strain and temperature simultaneously in a high speed event.

BRIEF DESCRIPTION OF THE DRAWINGS

The present invention will be readily understood by the following detailed description; taken in conjunction with accompanying drawings, illustrating by way of examples the principles of the invention. The drawings illustrate the design and utility of preferred embodiments of the present invention, in which like elements are referred to by like reference symbols or numerals. The objects and elements in the drawings are not necessarily drawn to scale, proportion or precise positional relationship; instead emphasis is focused on illustrating the principles of the invention.

DETAILED DESCRIPTION OF THE INVENTION

Figure 1:
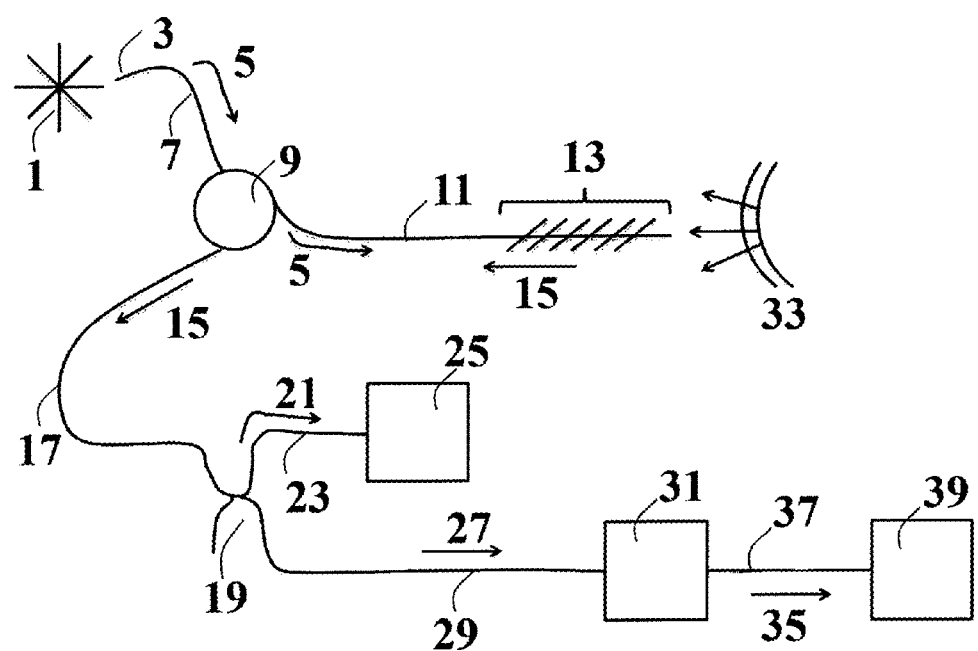
FIG. 1 is a diagram of a basic high speed fiber grating sensor system.

FIG. 1 is a diagram of a fiber grating sensor system for measuring key parameters during high speed events. That may include velocity, position, pressure, strain and temperature associated with burn deflagration and detonation of highly energetic material. A light source 1 that may be a spectrally broad band fiber or super radiant light source couples light into the fiber end 3 and the light beam 5 propagates through the input leg 7 of an optical coupler 9 which may be a three port optical circulator or a fiber beamsplitter. The light beam 5 is then directed to the output fiber leg 11 of the optical coupler 9 and directed into one or more fiber grating sensors 13. The fiber grating sensor or sensors 13 may be uniform or chirped fiber gratings. A portion of the light beam 5 is reflected back to the optical coupler 9 as the light beam 15. The spectral content of the light beam 15 depends primarily upon the spectral content of the illuminating light source 1 and the fiber grating sensor or sensors 13. Secondary effects may occur due to spectral attenuation associated with the optical fiber leads and components associated with the optical coupler 9. The return light beam 15 is then directed by the optical coupler 9 to the output lead 17 which couples the light beam to an output coupler 19 that may be an optical switch or a fixed fiber coupler. One portion of the light beam 15 is directed as the light beam 21 through an optical fiber 23 to an optical spectrometer 25 that is used to measure the spectral content of the light beam 21 prior to the high speed event. The second portion of the light beam 15 is directed as the light beam 27 through the optical fiber 29 to a high speed detector 31. The high speed detector 31 may consist of a single optical detector, an optical detector with a wavelength selective filter or a series of optical detectors with a series of optical filters associated with each detector. The action of a high speed environmental effect 33 is that it causes the fiber grating sensor or sensors 13 to change spectral characteristics modifying the properties of the reflected light beam 15 that in turn can result in changes to the optical signal 27 that is converted by the optical detector 31 into electrical signals 35 that are electrically connected via the conductive path 37 to a digital recording instrument 39 that can be a high speed digital storage oscilloscope. The variations that can occur due the environmental effect 33 include changes in the physical length of the fiber grating sensor or sensors 13 due to destruction of part of their length, changes in spectral reflection due to compression caused by pressure moving part of the fiber grating spectrum toward shorter wavelengths, changes in temperature moving part of the spectrum to longer (higher temperature case) or shorter (lower temperature case), or longitudinal or transverse strain. Details on these spectral shifts associated with fiber gratings can be found in E. Udd, *Fiber Grating Sensors*, in E. Udd and William B. Spillman, *Fiber Optic Sensors: an Introduction for Engineers and Scientists*, 2$^{nd}$ Edition, Wiley, 2011.

Figure 2:
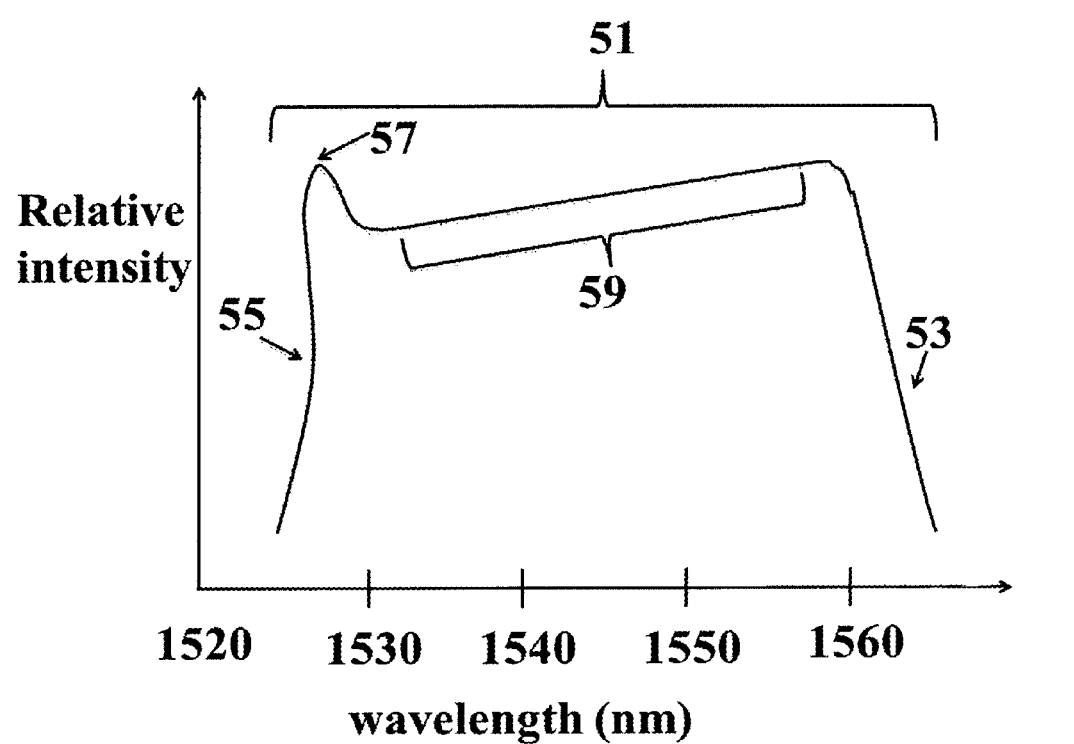
FIG. 2 is a diagram of the intensity of a broadband light source as a function of wavelength.

FIG. 2 is a graph showing the spectral output 51 of a broad band light source as a function of relative intensity versus wavelength. The spectrum which is typical of a broadband fiber light source operated in the telecommunication C band has a "forward" slope 53 in the region of 1560 nm, a "backward" slope 55 at about 1525 nm, a sharp peak 57 at about 1528 nm and gradual slope 59 between 1530 to nearly 1560 nm. The features of the spectral shape of the light source 1 can be used to measure key parameters at specific spatial positions associated with the fiber grating sensor or sensors 13. Pressure and temperature measurements at specific spatial locations are examples of key parameters for many high speed applications. By modifying or adjusting these spectral characteristics performance of the system described in association with FIG. 1 can be optimized.

Figure 2A:
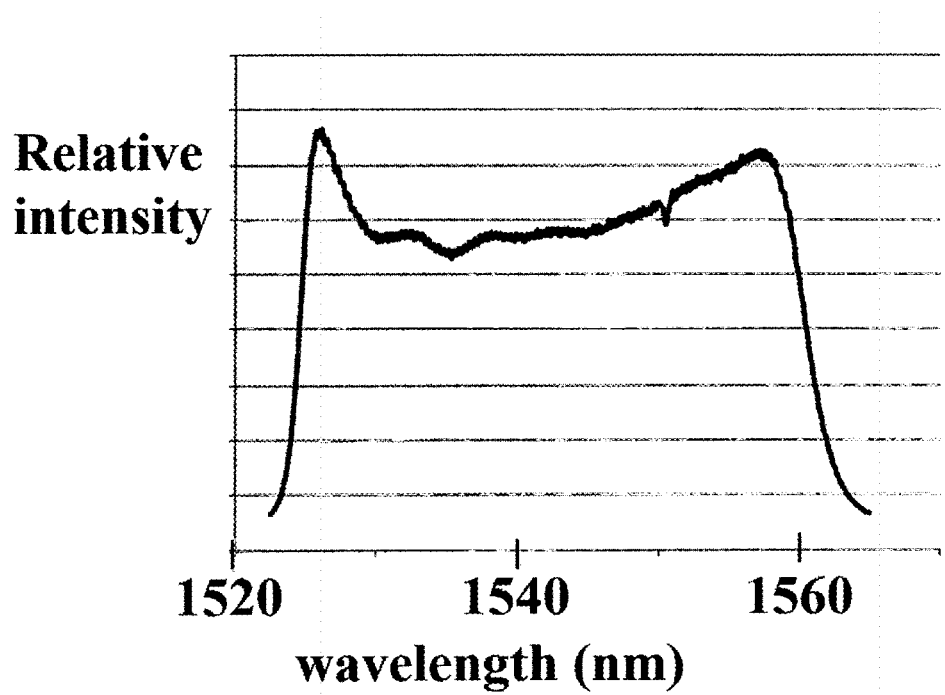
FIG. 2a is a graph of the intensity of a broad band fiber light source operating in the telecommunications C-band.
Figure 2B:
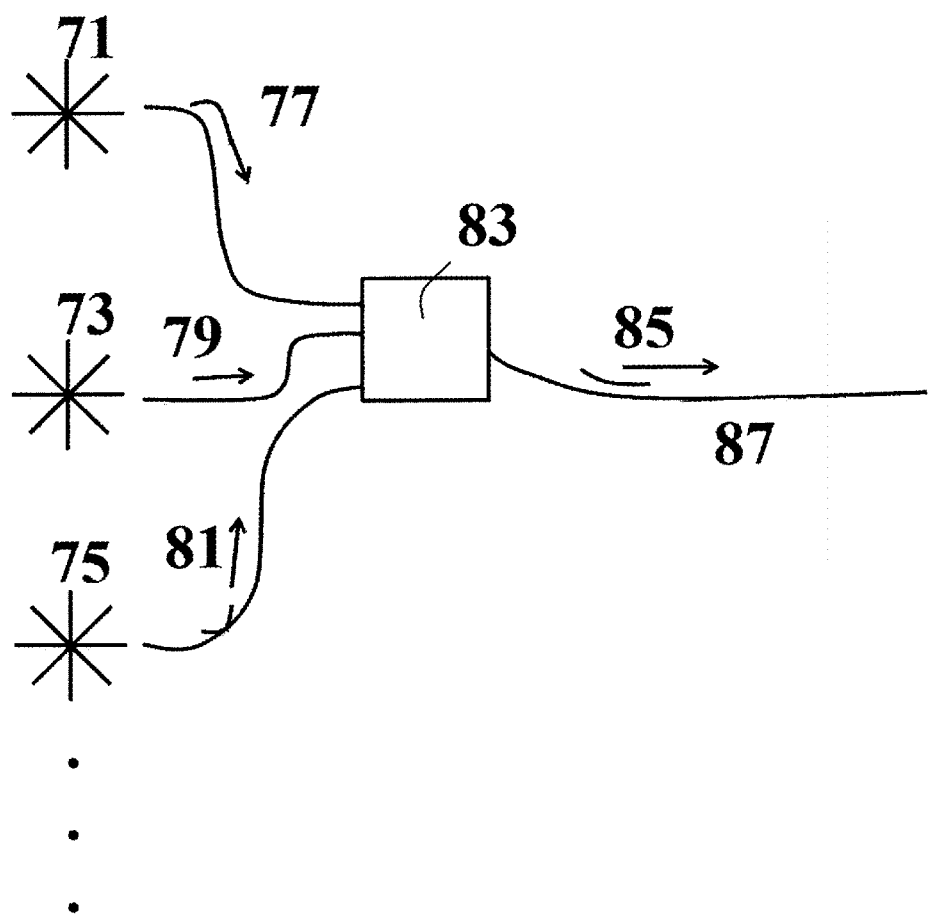
FIG. 2b is a diagram of wavelength multiplexed light sources.
Figure 2C:
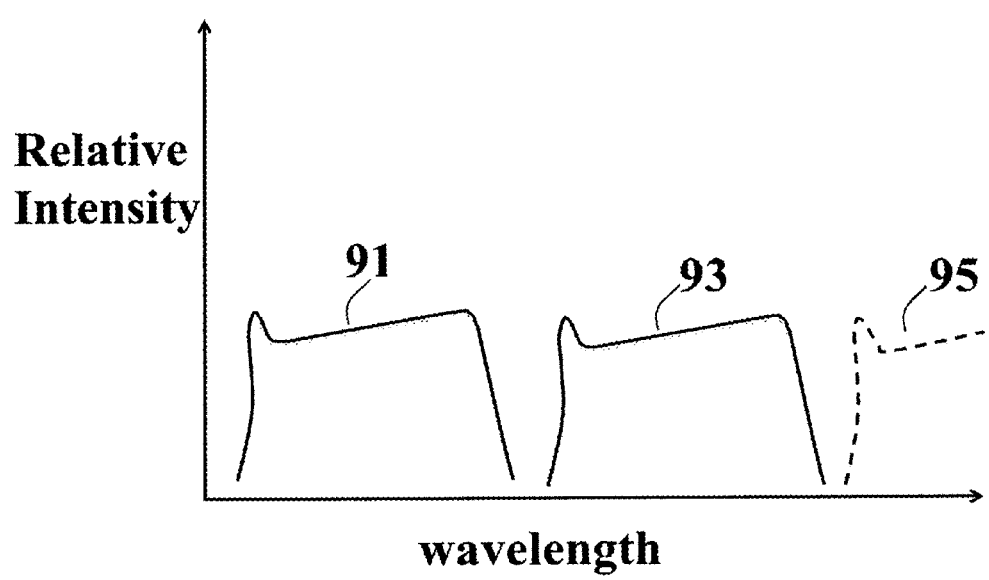
FIG. 2c is a graph of the spectra of multiplexed broad band light sources.
Figure 2D:
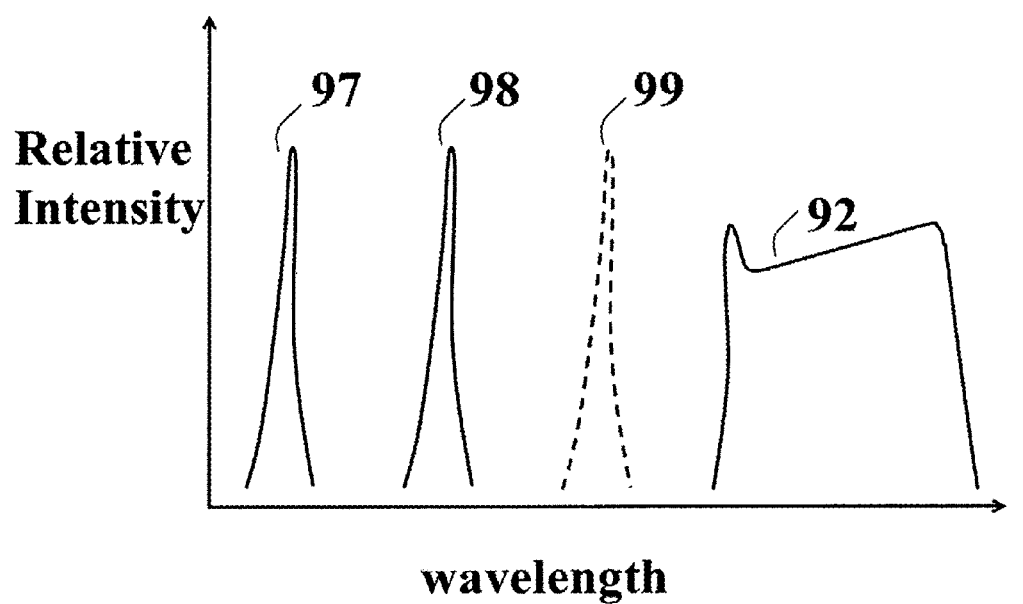
FIG. 2d is a graph of the spectra of multiplexed narrow and broad band light sources.

FIG. 2a is a graph of an actual fiber light source with features similar to those described in association with FIG. 2. FIG. 2b shows a series of light sources 71, 73 and 75 that generate light beams 77, 79 and 81 that are coupled into the wavelength combiner 83 (that might be a series of fiber beamsplitters or wavelength division multiplexing elements) and used to couple the combined light beam 85 into the source output fiber 87. This effective light source could be used to replace the light source 1 in FIG. 1. It can be used to enhance performance by extending the effective bandwidth of the light source 1 which in turn results in greater dynamic range for pressure, strain and temperature measurements. The approach can also be used to provide more spectral edges and peaks that allow more measurements to be made at each spectral location. Additional details and descriptions on these capabilities will be made in the following paragraphs. FIG. 2c shows in graphical form a series of multiplexed broad band light source profiles that enhance the overall spectral with of the light source and provide more spectral edges and peaks. FIG. 2d shows in graphical form the output spectrum of narrow band light sources 97, 98 and 99 that have been multiplexed in combination with a broad band light source 92. The purpose FIGS. 2b to 2d is to illustrate some of the methods that can be used to modify the spectral shape of the light source 1. It is also possible to use filters placed in front of the light source to modify the spectral shape of the light source and this will be described later.

Figure 3:
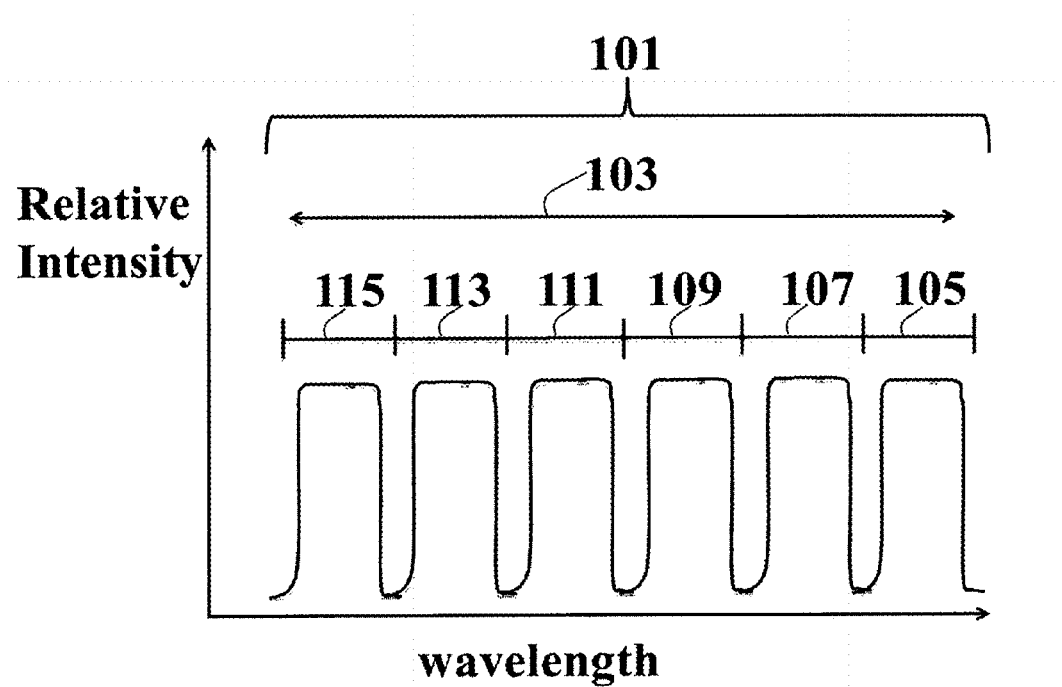
FIG. 3 is a diagram of the reflection spectrum of a chirped fiber grating fabricated using masking techniques so that certain defined spectral bands have lower reflectivity.

FIG. 3 shows the spectral content 101 of a chirped fiber grating sensor 13 plotted on a graph of wavelength versus reflected intensity. The spectral content 101 has been modified to optimize for measurements of key parameters. The chirped fiber grating 13 has a specific spatial length 103 and at spatial intervals 105, 107, 109, 111, 113 and 115 the reflectivity of the fiber grating has been lowered. These intervals 105, 107, 109, 111, 113 and 115 may be uniform or vary in length. The number of intervals chosen determines the number of spatial positions that can be used to measure key parameters. The spacing of the intervals determines the physical location where measurements are to be made.

Figure 4:
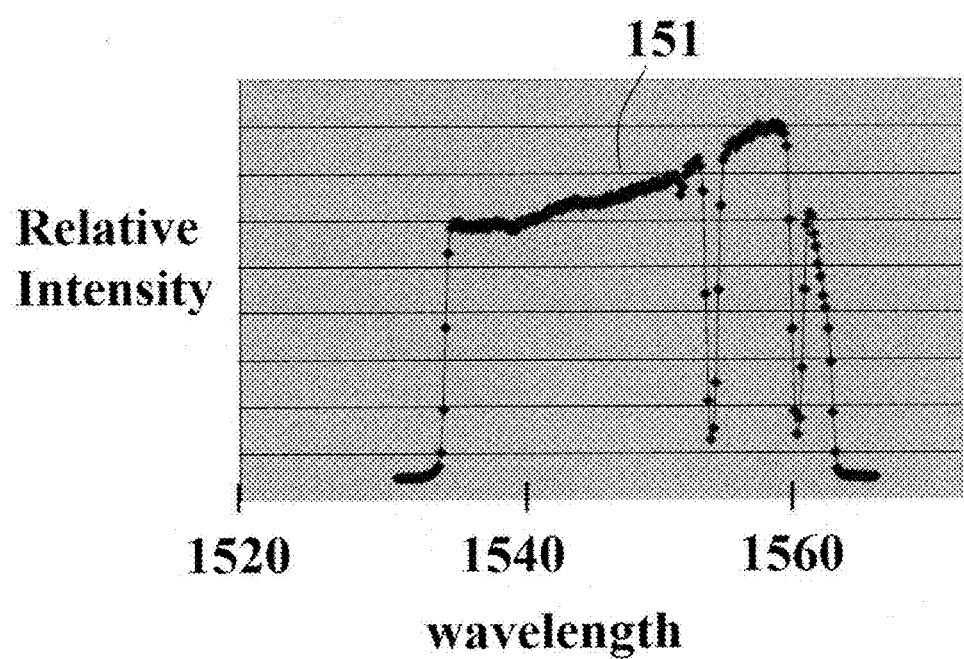
FIG. 4 is a graph of the spectral reflectivity of a 135 mm long chirped fiber grating with low reflectivity bands to use to spatially locate pressure, strain and temperature measurements.
Figure 5:
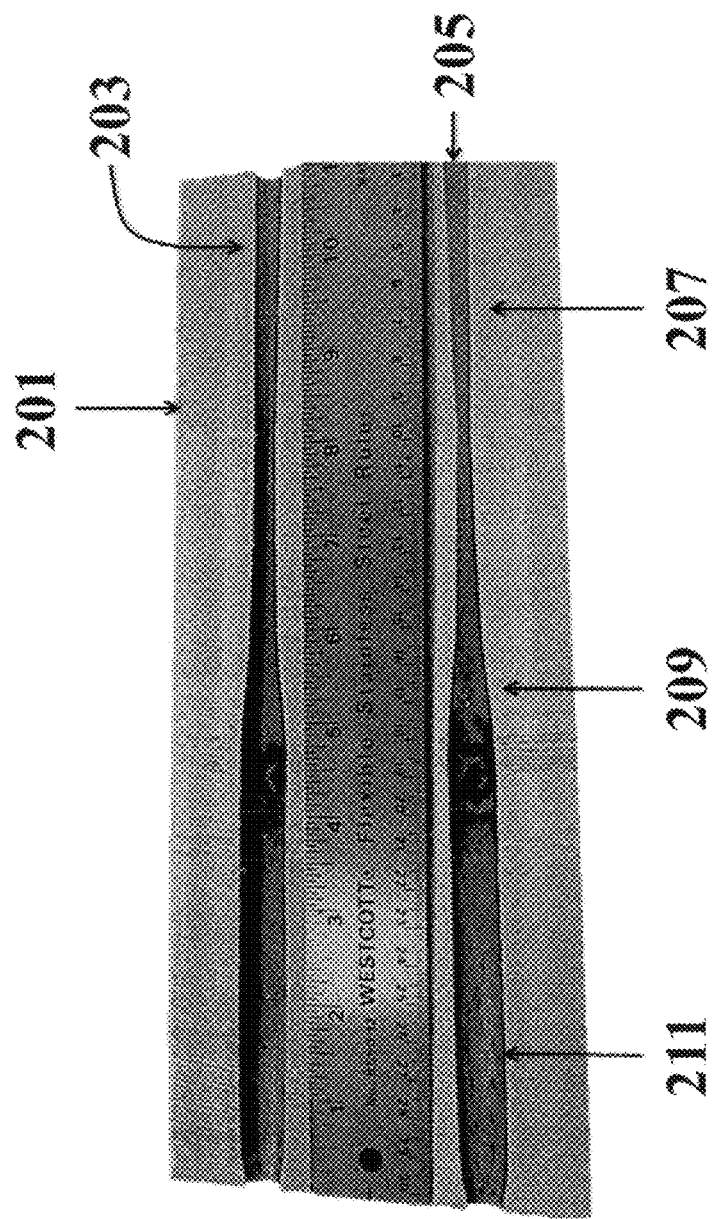
FIG. 5 is a photo of the cross section of a test pipe used to demonstrate pressure measurements capabilities during burn, deflagration and detonation of highly energetic material placed within the pipe.

As a specific experimental example consider the chirped fiber grating sensor 13 profile 151 of FIG. 4. The chirped fiber grating associated with FIG. 4 has a length of 135 mm and spans the spectrum from approximately 1532 to 1562 nm for an effective chirped rate of 2.2 nm per cm. Two low reflectivity spectral regions are defined at 1552 and 1559 nm by placing a metal mask (that in this case is approximately 5 mm) in front of the laser beam illuminating a phase mask during the fabrication of the fiber grating sensor. The metal mask can be located at any position along the phase mask, defining a spatial position identified by a drop of the spectral reflectivity at that point. The 135 mm chirped fiber grating sensor 13 associated with FIG. 4 was then placed into an aluminum tube 201 shown in FIG. 5. The pipe 201 which is shown in cross section after test in FIG. 5 is approximately 6.35 cm in diameter with a center hole 203 of 6.3 mm. The chirped fiber grating sensor 13 was then inserted into the pipe 201 and a read out system similar to that associated with FIG. 1 connected. The center hole 203 of the pipe 201 was then loaded with highly energetic material and detonated by igniting end 205 of the pipe. The region 207 of the pipe 201 is the area associated with burn of the energetic material in the pipe. The region 209 is associated with deflagration which is the transition region from burn to deflagration. The region 211 is associated with full detonation of the energetic material. The expansion of the pipe center hole 201 enables the pressure to be measured in each region.

Figure 6:
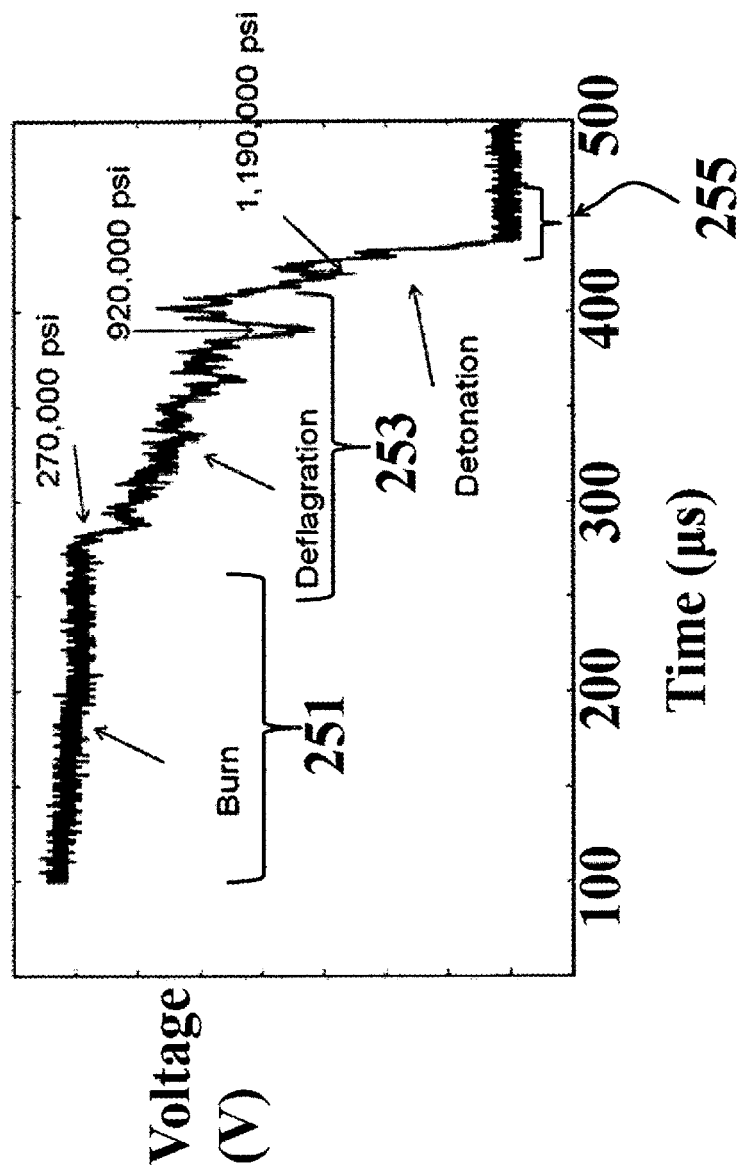
FIG. 6 is graph of results associated with the pipe of FIG. 5 and the 135 mm chirped fiber grating associated with FIG. 4 placed within it.

FIG. 6 shows the output of the 135 mm chirped fiber grating 13 associated with FIG. 4 when illuminated by a light source 1 with spectral characteristics similar to those illustrated by FIG. 2. During burn pressure rises and the entire chirped fiber grating spectrum 151 shifts toward shorter wavelengths. Because this is the sloped region 59 of the light source 1 the result is an overall spectral shift during burn that corresponds to a specific pressure rise over the time interval 251 of about 270,000 psi. During the second time interval 253 deflagration occurs and the passage of the peaks that originally were at 1552 and 1559 nm move over the peak 57 of the light source 1 at pressures that correspond to approximately 920,000 and 1,190,000 psi respectively. The sharp dips in the amplitude of the output detector 31 are very clear as the spectral region corresponding to these spatial locations are forced by pressure over the 1528 inn spectral peak 57. The measured pressures at these locations correlate closely with pressure calculations associated with the expansion of the center hole 203 of the aluminum pipe 201.

Figure 7:
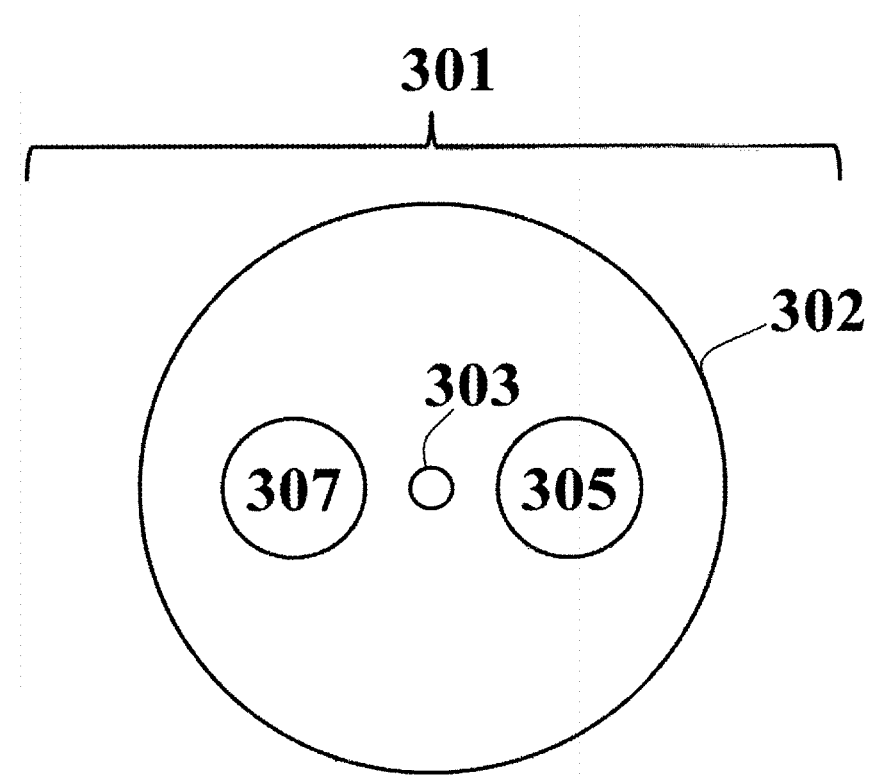
FIG. 7 is an end on view of an optical fiber with side holes along its length.
Figure 8:
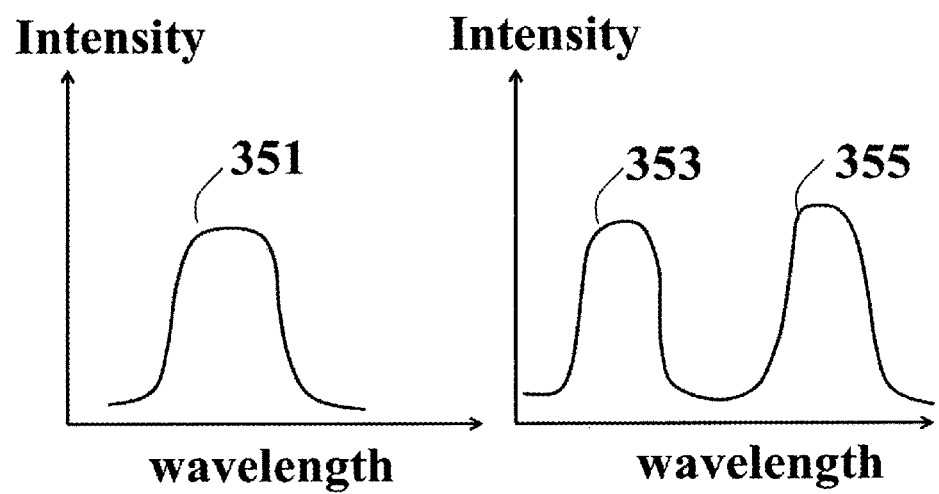
FIG. 8 is an illustration in the change of the spectrum of a fiber grating written into side hole optical fiber with pressure.

As another illustration of using the special spectral shape of the light source 1 to perform measurements of key parameters, consider the side hole optical fiber 301 whose cross section is shown in FIG. 7. It consists of an optical fiber 302 with a light guiding core 303 and two or more air holes 305 and 307 placed about the core 303. In the case of FIG. 7 there are two side holes 303 and 307 placed on either side of the optical core 303. When a fiber grating is written onto side hole optical fiber 301; a single uniform fiber grating spectra 351 shown in FIG. 8 results. When sufficient pressure is applied the single peak spectrum 351 splits into the two spectral peaks 353 and 355. The peak to peak separation enables a measurement of pressure only and the overall spectral shift provides a measure of temperature (see E. Udd, *Fiber Grating Sensors*, in E. Udd and William B. Spillman, *Fiber Optic Sensors: an Introduction for Engineers and Scientists*, $2^{nd}$ Edition, Wiley, 2011).

Figure 9:
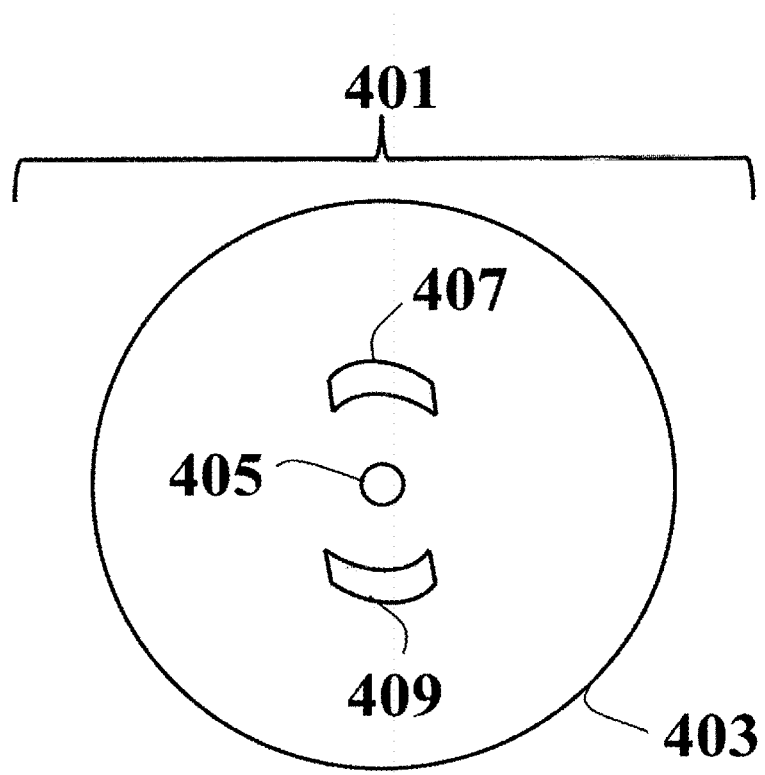
FIG. 9 is an illustration of an end view of birefringent optical fiber.

Another type of optical fiber grating sensor 13 that may be used to produce dual spectral peaks is birefringent optical fiber. This type of optical fiber is available commercially in many forms as polarization maintaining optical fiber. FIG. 9 illustrates a cross section of birefringent optical fiber 401. That consists of an optical fiber 403 with an optical core 405 and two "side pits" of softer glass material 407 and 409. This type of geometry for polarization preserving optical fiber is offered by Fibercore commercially and other types of polarization preserving fiber using stress rods and elliptically clad optical fibers are also offered. Their common feature is that across the optical core there are two distinct effective indices of refraction along transverse, orthogonal axes. When a fiber grating is written onto this type of optical fiber two spectral peaks 451 and 453 are created.

Figure 10:
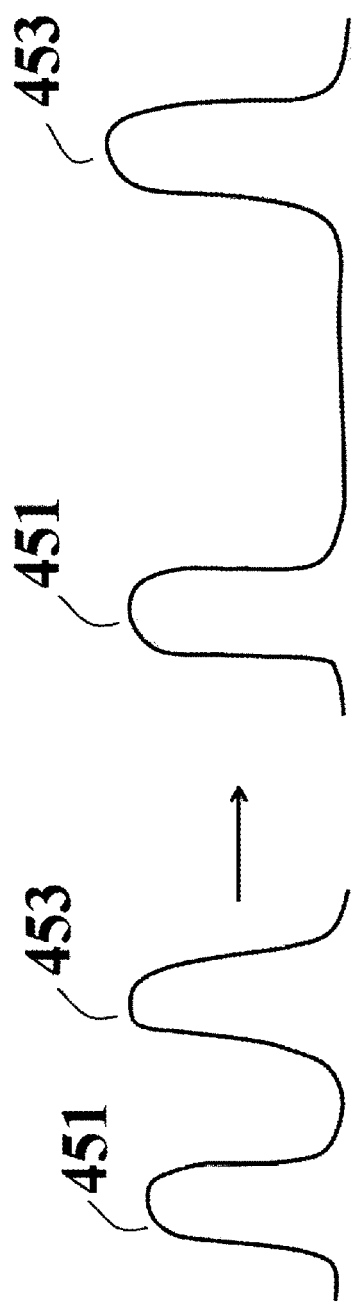
FIG. 10 is an illustration of the change in spectrum of a fiber grating written into birefringent optical fiber when pressure is applied to it.

Pressure changes cause the peaks to shift further apart or together. This is shown in FIG. 10.

Figure 11:
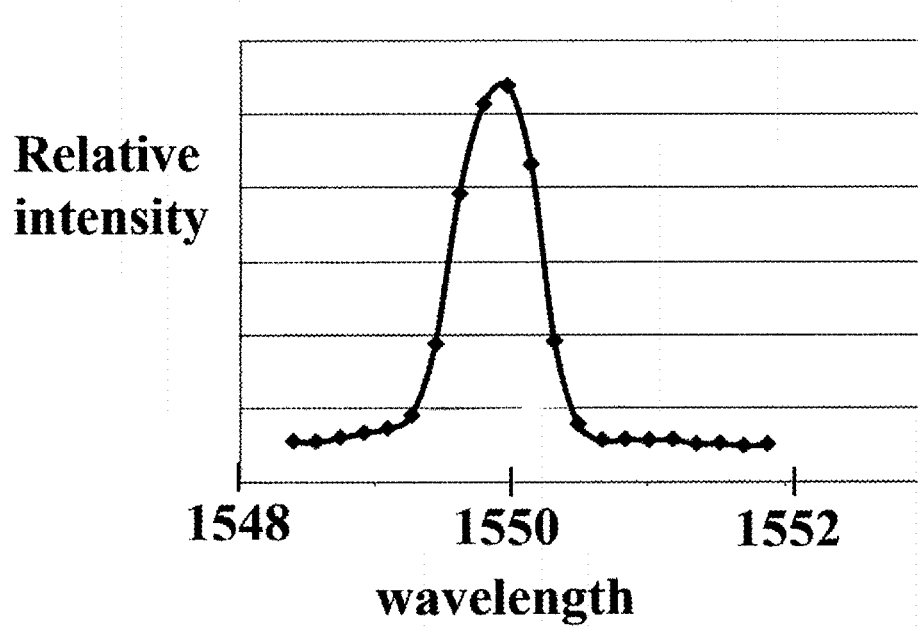
FIG. 11 is a graph of the spectrum of a fiber grating written into side hole optical fiber at atmospheric pressure.
Figure 12:
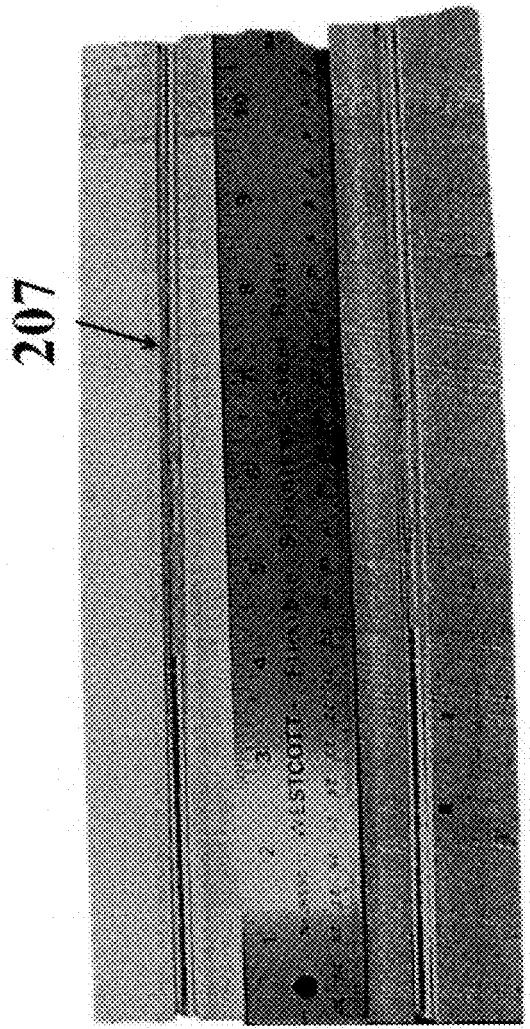
FIG. 12 is a photo of a cross sectioned test pipe that was loaded with highly energetic material to evaluate the pressure and temperature response of a fiber grating written into side hole optical.
Figure 13:
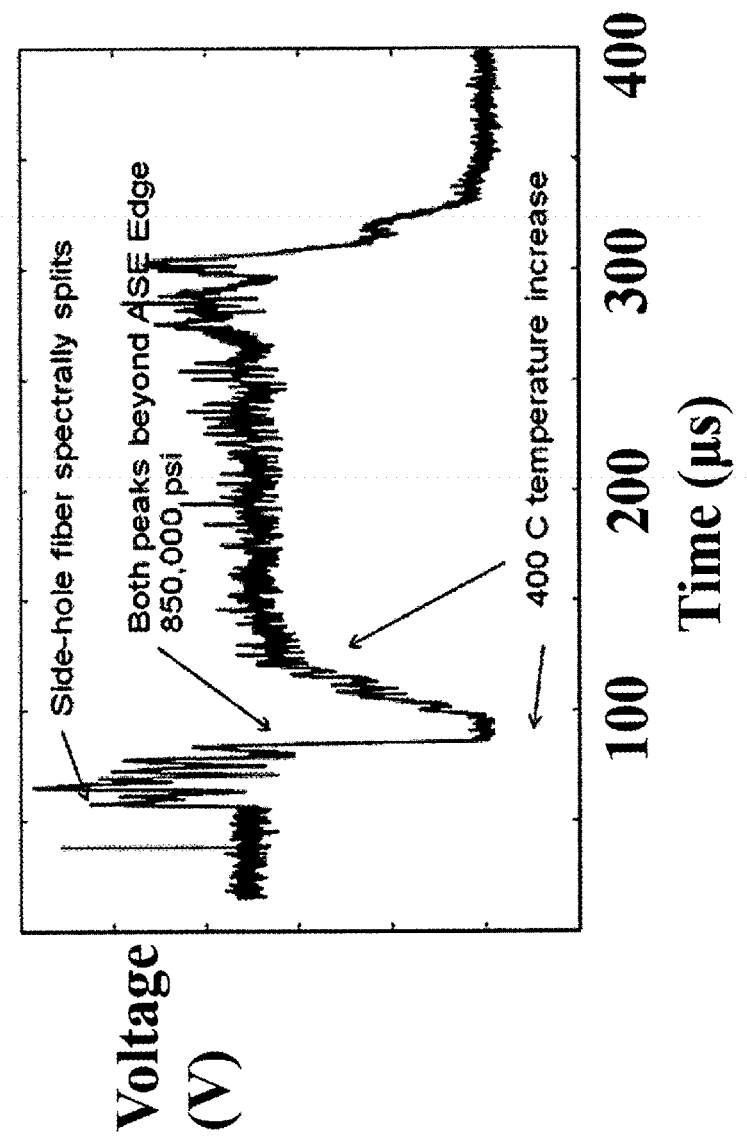
FIG. 13 is the response of the spectrum of the side hole fiber grating to high speed pressure and temperature changes in the test pipe of FIG. 12.

FIG. 11 is a graph of the spectra of a 6 mm uniform fiber grating sensor 13 written onto single mode side hole optical fiber with an overall diameter of 125 microns and side holes about the core of approximately 33 microns in diameter. The side hole fiber grating sensor 13 was then placed into a pipe shown in FIG. 12 which was loaded with energetic material and cross sectioned after ignition. Unlike the pipe shown in FIG. 5 detonation did not take place. Instead burn occurred and pressure and temperature fluctuated in the pipe during the test. FIG. 13 shows the output on the optical detector 31 during the test. When ignition occurs; the single peak splits into two and the total power on the detector rapidly rises as overall reflectivity of the fiber grating sensor 13 rises. The peaks are forced by increasing pressure toward shorter wavelengths and fall over the spectral edge 55 of the light source 1 resulting in a drop of the optical signal to zero. As the pipe continues to heat up first one peak is forced back toward longer wavelengths and then the second peak is forced over and the total power is again maximized before pressure eventually again dominates and forces both peaks over the spectral edge 55. In this way the effective change in temperature over very short time intervals can be measured.

Figure 14:
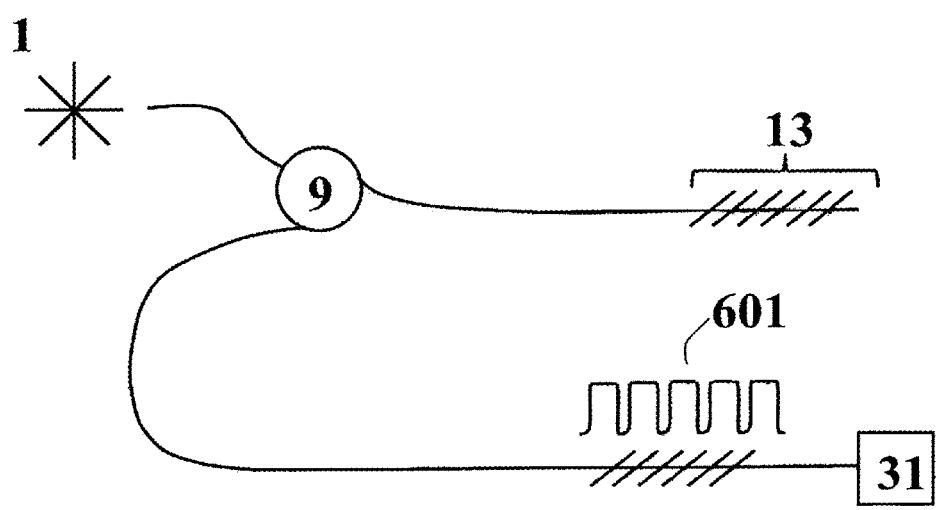
FIG. 14 is a block diagram of a system to measure high speed events with an optical fiber grating filter with low reflectivity spectral regions placed in front of the output detector.
Figure 15:
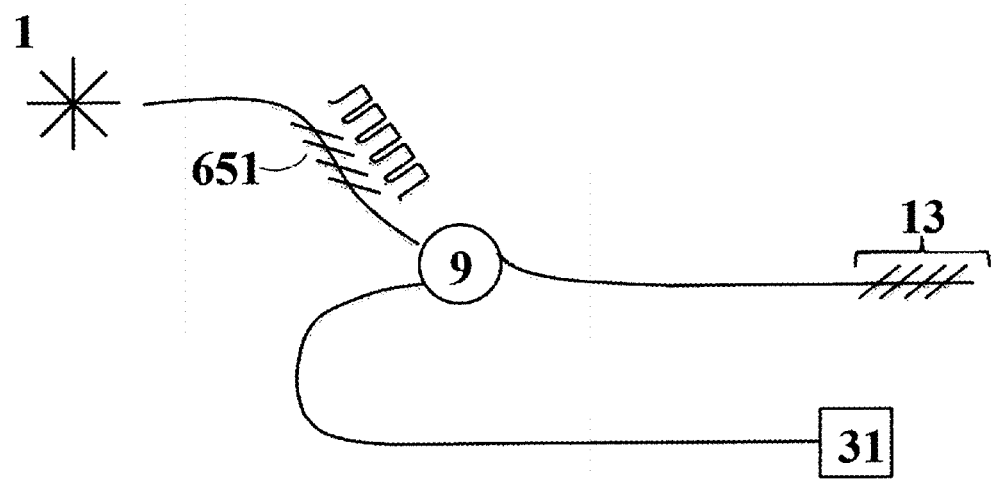
FIG. 15 is a block diagram of a system to measure high speed events with an optical fiber grating filter with low reflectivity spectral regions placed at the output of the broadband light source.

To obtain still higher accuracy of the system one or more additional spectral filters could be used to shape the spectrum of the broad band light source 1 or modify the spectral characteristics of the optical detector 31. FIG. 14 shows the case where a spectral filter 601 that might be a fiber grating or a multi-channel wavelength division multiplexing device is used to provide one or more spectral filter edges. FIG. 15 shows the case where an optical filter 651 is used in conjunction with the light source to provide additional spectral filter edges. Again a fiber grating that might be a chirped fiber grating with variable reflection such as that illustrated by FIG. 3 might be used.

Figure 16:
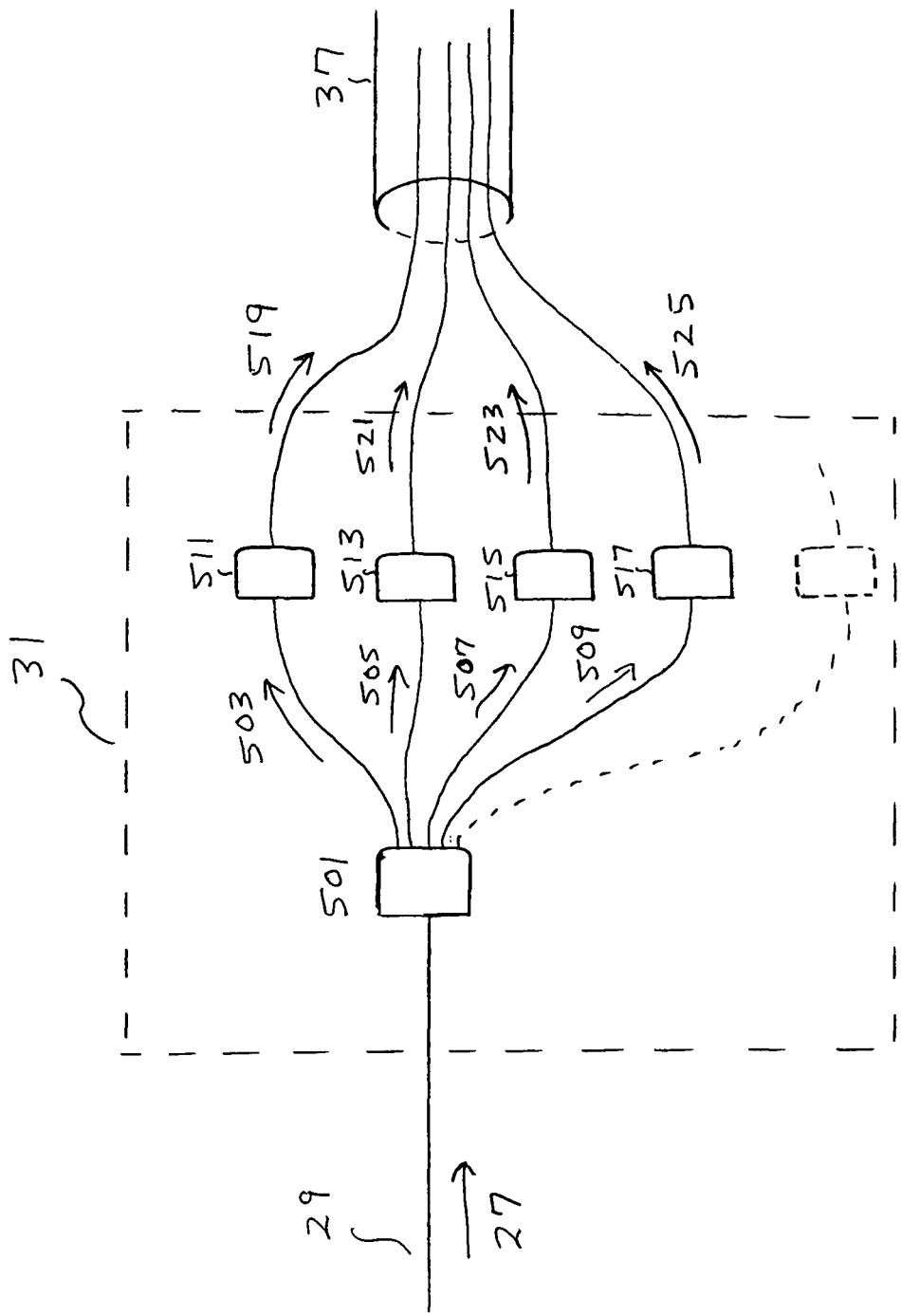
FIG. 16 is a block diagram of the output detection portion of the system with a wavelength division multiplexing element splitting out portions of the spectral signal to a series of high speed optical detectors.

The optical detector 31 of FIG. 1 can consist of wavelength division multiplexed detectors designed to measure changes in a particular spectral region at high speed. FIG. 16 shows the input optical fiber 29 carrying the spectral signal 27 from the fiber grating sensors 13. A wavelength division multiplexing device 501 that may consists of a series of dielectric filters, bulk grating or other dispersive elements separates portions of the optical spectrum associated with the light beam 27 into the light beams 503, 505, 507 and 509 that are directed via optical fibers or free space imaging to the high speed optical output detectors 511, 513, 515 and 517. The electrical outputs from these detectors 519, 521, 523 and 525 are then directed into the output electrical cable 37 which in turn connects to the digital output device 39 that may be a multichannel digital oscilloscope.

Thus there has been shown and described a novel system for measuring high intensity pressure or blast waves or other environmental parameters including those that destroy and optical fiber and fulfills all the objectives and advantages sought therefore. Many change, modifications, variations and

What is claimed is:

1. A fiber grating sensor system to measure spatial position, pressure and temperature with better than one microsecond resolution, comprising: a first light source being a broadband light source with at least one spectral edge or peak changing in optical power by more than ten percent per nanometer of spectral change which generates a first light beam; and a first optical coupler which captures said first light beam in first input optical fiber and directs it via a second optical fiber to a first fiber grating sensor with a predefined spectral shape, a second light beam which is a portion of said first light beam that reflects off said first fiber grating sensor and is directed back toward said first optical coupler and directed via a third optical fiber to a first optical detector with a predefined spectral response, the output from said first optical detector being directed toward a first electrical signal storage device.

2. A fiber grating sensor system to measure spatial position, pressure and temperature with better than one microsecond resolution as in claim 1 with a second optical coupler which captures said second light beam and directs a first portion of said second light beam to an output spectrometer and second portion of said second light beam to said first optical detector.

3. A fiber grating sensor system to measure spatial position, pressure and temperature as in claim 1 with said first fiber grating sensor being a chirped fiber grating with one or more reflective spectral regions that are at least 20% lower than peak reflectance of said chirped fiber grating.

4. A fiber grating sensor system to measure spatial position, pressure and temperature as in claim 1 where a chirped fiber grating with one or more reflective spectral regions that are at least 20% lower than peak reflectance of said chirped fiber grating is placed in front of said first optical detector.

5. A fiber grating sensor system to measure spatial position, pressure and temperature as in claim 1 where said first fiber grating sensor is a fiber grating with a uniform period in variation of index of refraction.

6. A fiber grating sensor system to measure spatial position, pressure and temperature as in claim 5 where said first fiber grating sensor with a uniform has a length of less than 2 mm.

7. A fiber grating sensor system to measure spatial position, pressure and temperature as in claim 1 where a chirped fiber grating with one or more reflective spectral regions that are at least 20% lower than peak reflectance of said chirped fiber grating is placed in front of said first light source.

8. A fiber grating sensor system to measure spatial position, pressure and temperature as in claim 7 with said first fiber grating sensor being a chirped fiber grating with one or more reflective spectral regions that are at least 20% lower than peak reflectance of said chirped fiber grating.

9. A fiber grating sensor system to measure spatial position, pressure and temperature as in claim 7 with said first fiber grating sensor with a uniform has a length of less than 2 mm.

10. A fiber grating sensor system to measure spatial position, pressure and temperature with better than one microsecond resolution, comprising: a first light source being a broad band light source with at least one spectral edge or changing in optical power by more than ten percent per nanometer of spectral change which generates a first light beam; and a first optical coupler which captures said first light beam in first input optical fiber and directs it via a second optical fiber to a first fiber grating sensor with a predefined spectral shape, a second light beam which is a portion of said first light beam that reflects off said first fiber grating sensor and is directed back toward said first optical coupler and to a second optical coupler with one port of said second optical coupler directed to a first optical detector with a predefined spectral response, and the second port of said optical coupler being directed to an optical spectrometer.

11. A fiber grating sensor system to measure spatial position, pressure and temperature as in claim 10 with said first fiber grating sensor being a chirped fiber grating with one or more reflective spectral regions that are at least 20% lower than peak reflectance of said chirped fiber grating.

12. A fiber grating sensor system to measure spatial position, pressure and temperature as in claim 10 where a chirped fiber grating with one or more reflective spectral regions that are at least 20% lower than peak reflectance of said chirped fiber grating is placed in front of said first optical detector.

13. A fiber grating sensor system to measure spatial position, pressure and temperature as in claim 12 where said first fiber grating sensor is a fiber grating with a uniform period in variation of index of refraction.

14. A fiber grating sensor system to measure spatial position, pressure and temperature as in claim 13 where said first fiber grating sensor with a uniform has a length of less than 2 mm.

15. A fiber grating sensor system to measure spatial position, pressure and temperature as in claim 10 where a chirped fiber grating with one or more reflective spectral regions that are at least 20% lower than peak reflectance of said chirped fiber grating is placed in front of said first light source.

16. A fiber grating sensor system to measure spatial position, pressure and temperature as in claim 15 with said first fiber grating sensor being a chirped fiber grating with one or more reflective spectral regions that are at least 20% lower than peak reflectance of said chirped fiber grating.

17. A fiber grating sensor system to measure spatial position, pressure and temperature as in claim 15 with said first fiber grating sensor with a uniform has a length of less than 2 mm.

18. A fiber grating sensor system to measure spatial position, pressure and temperature as in claim 17 with said first fiber grating sensor is written into optical fiber with side holes.

* * * * *